Figure 1:
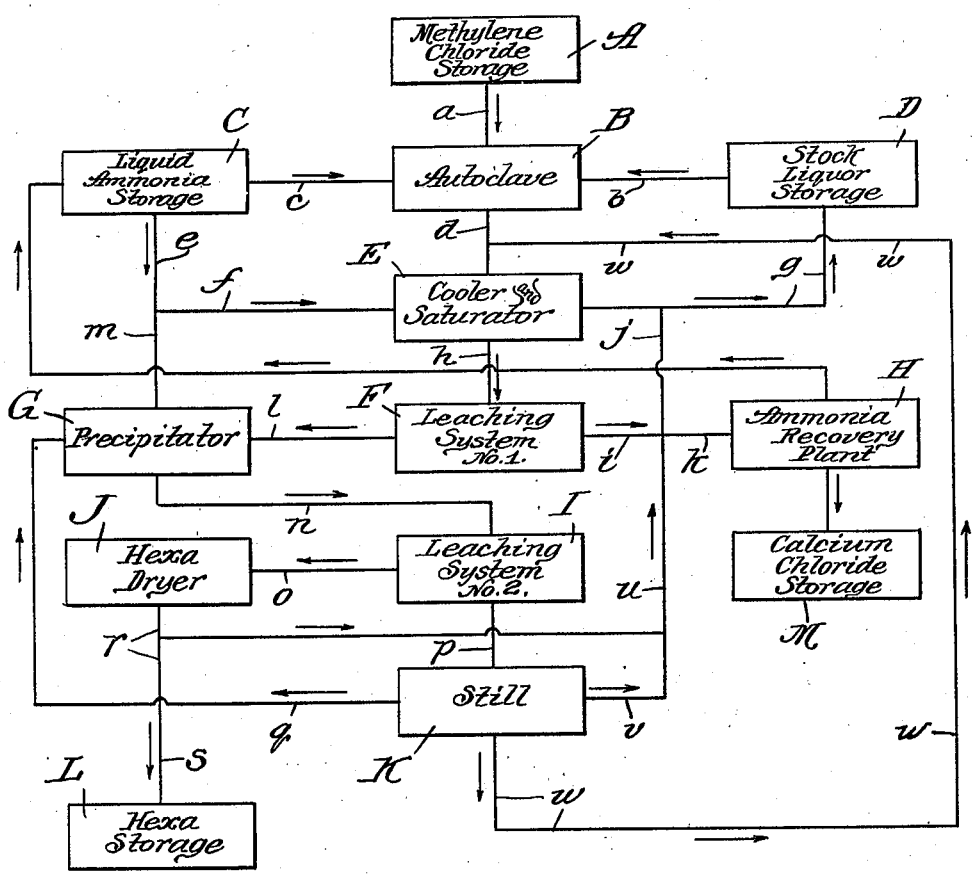

May 31, 1927.  
C. B. CARTER  
1,630,782  
PROCESS AND APPARATUS FOR PRODUCING HEXAMETHYLENETETRAMINE  
AND AMMONIUM CHLORIDE  
Filed July 30, 1926 2 Sheets-Sheet 1

Inventor:  
Carnie B. Carter, deceased,  
By Myrtice G. Carter, Executrix,  
Byrgenforth, Lee, Chritton & Wiles,  
Attys.

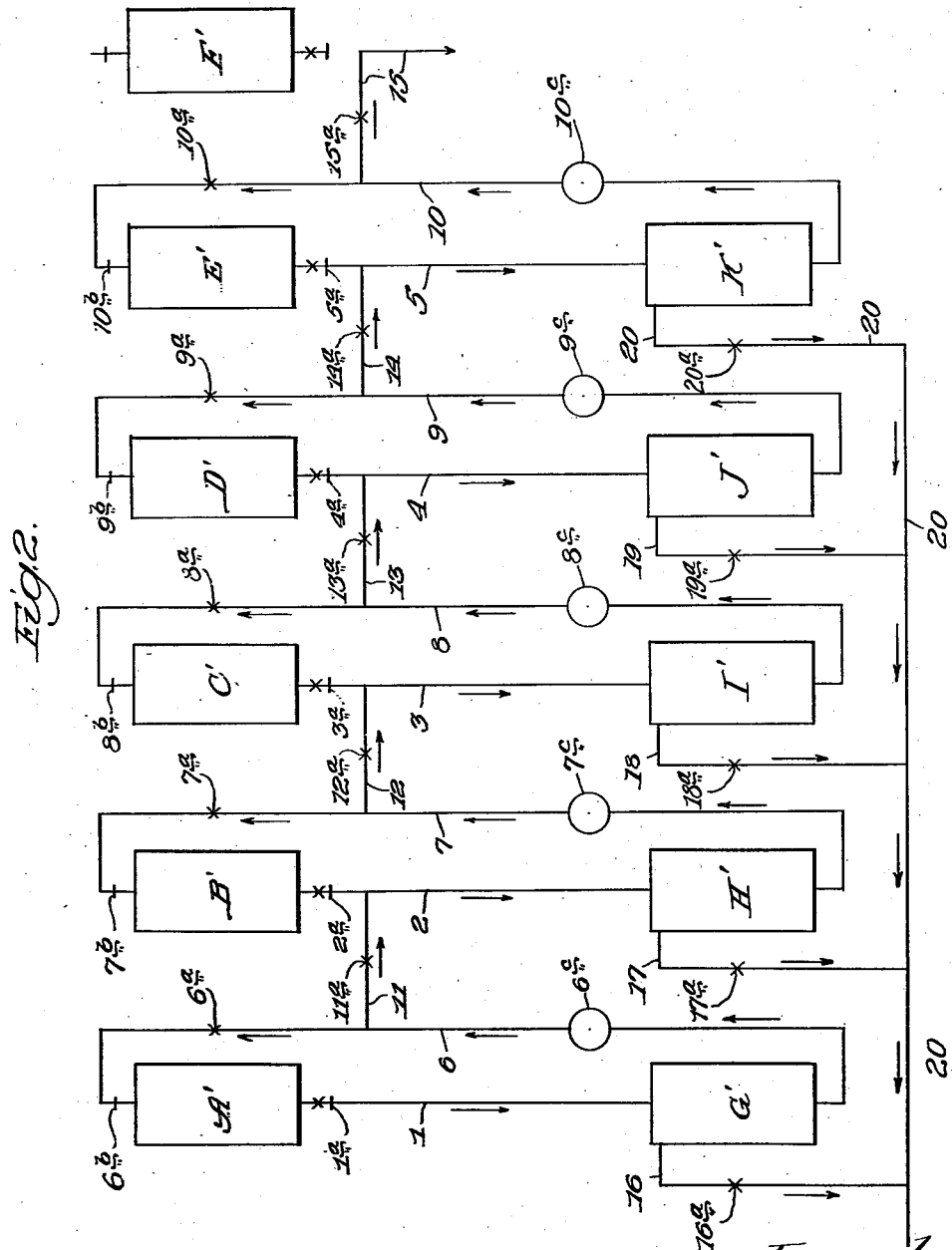

Patented May 31, 1927.

1,630,782

UNITED STATES PATENT OFFICE.

CARNIE B. CARTER, DECEASED, LATE OF PITTSBURGH, PENNSYLVANIA; BY MYRTICE G. CARTER, EXECUTRIX, OF PITTSBURGH, PENNSYLVANIA, ASSIGNOR TO S. KARPEN & BROS., OF CHICAGO, ILLINOIS, A CORPORATION OF WEST VIRGINIA.

PROCESS AND APPARATUS FOR PRODUCING HEXAMETHYLENETETRAMINE AND AMMONIUM CHLORIDE.

Application filed July 30, 1926. Serial No. 125,958.

This invention relates particularly to the production of hexamethylenetetramine and ammonium chloride, and involves, as an important feature, a novel method of effecting separation of hexamethylenetetramine from ammonium chloride.

The primary object is to provide an economical method of producing hexamethylenetetramine and ammonium chloride and effecting separation thereof; and, further, to provide apparatus especially suited to the practice of such process.

A mixture of hexamethylenetetramine and ammonium chloride, in certain proportions, results from a reaction between methylene chloride and ammonia. These compounds may be produced by reaction between methylene chloride and liquid ammonia, or by reaction between methylene chloride and aqueous ammonia. Such reaction may be carried out under pressure, or in a closed chamber. The reaction may be expedited by means of heat, practical working temperatures ranging from about 60° C. to about 130° C. The reaction is greatly expedited by employing a large excess of ammonia, preferably 300 to 400% excess. Where such excess ammonia is employed, the reaction preferably is performed at a temperature of about 100° C. in an autoclave, the pressure developed under such conditions being not excessive and the reaction being completed within a period of a few hours.

It is preferred to form the hexamethylenetetramine and ammonium chloride by reacting upon methylene chloride with aqueous ammonia, employing a large excess of ammonia to expedite the reaction and enable it to be carried out within a comparatively short period, avoiding excessive pressures. Regardless of the manner in which the mixture of these salts is produced, the separation thereof may be economically effected in accordance with the invention herein described, which avoids the use of expensive solvents, and which also avoids the expense of evaporating large quantities of water.

Both hexamethylenetetramine and ammonium chloride possess great solubility in water, as has long been known; and the presence of either salt in the water solution does not greatly affect its solvent power for the other. In the present invention, certain discoveries of the inventor are utilized in a highly advantageous manner. Thus, hexamethylenetetramine has a very low solubility in water highly surcharged with ammonia gas. As much as 90% of the hexamethylenetetramine contained in a saturated aqueous solution, regardless of the presence of ammonium chloride in the solution, can be "salted out" in highly pure crystalline form by surcharging the solution with ammonia. On the other hand, the ammonia does not decrease the solubility with respect to ammonium chloride, but increases such solubility to some extent. Again, methylene chloride reacts readily with ammonia in an aqueous solution which is saturated with respect to both ammonium chloride and hexamethylenetetramine. In such reaction, carried on at elevated temperature, ammonia is consumed and the freshly formed ammonium chloride and hexamethylenetetramine pass into solution. The ammonium chloride and hexamethylenetetramine thus formed in such saturated solution may be precipitated by cooling and surcharging the liquor with ammonia, that is, by restoring in the liquor the ammonia consumed in the reaction.

In inventor's application Serial No. 691,673, filed February 9, 1924, is described the manufacture of hexamethylenetetramine from methylene chloride and aqueous ammonia. The present invention is in the nature of a modification of the invention described in said application, introducing improved methods of effecting separation of the products.

Apparatus especially well adapted for the practice of the present process is illustrated in the accompanying drawings, in which—

Fig. 1 represents a flow sheet showing diagrammatically the improved apparatus for producing hexamethylenetetramine and ammonium chloride from methylene chloride and aqueous ammonia, the apparatus including also an ammonia recovery plant, enabling the recovered ammonia to be reused in the process of producing fresh hexamethylenetetramine in cases where it is not desired to use the ammonium chloride for other purposes; and Fig. 2 illustrates diagrammatically leaching apparatus suitable for use at F and/or I in the plant diagrammatically illustrated in Fig. 1.

Referring to Fig. 1, A designates a storage-tank for methylene chloride; B, an autoclave; C, an ammonia storage-tank, preferably for liquid ammonia; D, a stock-liquor storage-tank which in the preferred process contains water saturated with hexamethylenetetramine, and with ammonium chloride, and with ammonia; E, a cooler and saturator adapted to receive the entire charge from the autoclave after the reaction has been completed; F, leaching system No. 1 comprising preferably the apparatus shown in Fig. 2, the hexamethylenetetramine being leached from the ammonium chloride in leaching system No. 1; G, a precipitator which receives the filtrate from leaching system No. 1 and in which the hexamethylenetetramine is precipitated by surcharging the filtrate therein with ammonia; H, an ammonia recovery plant in which the ammonium chloride recovered from leaching system No. 1 may be treated, as for example, with milk of lime, the recovered ammonia being conveyed to tank C; I, leaching system No. 2 which may comprise apparatus of the kind shown in Fig. 2, the precipitated hexamethylenetetramine from G being here subjected to leaching with water charged with ammonia to remove the ammonium chloride remaining in the wetting solution of the precipitated hexamethylenetetramine from the precipitator G; J, a drier for the purified hexamethylenetetramine received from leaching system No. 2, the ammonia and water vapor evaporated at J being conveyed to a still K, and the dried hexamethylenetetramine being conveyed to the hexamethylenetetramine storage-tank L; and M, a storage-tank for calcium chloride received from the ammonia recovery plant H, assuming the ammonium chloride to be treated at H with milk of lime.

The routing of materials through the apparatus shown in Fig. 1 is indicated in the main by lines and arrows, as follows: line $a$ between the methylene chloride tank A and autoclave; line $b$ between the stock-liquor tank D and the autoclave; line $c$ between the ammonia tank C and the autoclave; line $d$ between the autoclave and the cooler and saturator E; lines $e$ and $f$ between the ammonia tank C and the cooler and saturator E; line $g$ between the cooler and saturator E and the stock-liquor tank D; line $h$ between the cooler and saturator E and the leaching system F; lines $i$ and $j$ from leaching system F to line $g$; line $k$ from the line $i$ to the ammonia recovery plant; line $l$ from leaching system F to precipitator G; line $m$ from the line $e$ of the ammonia tank C to precipitator G; line $n$ from the precipitator G to leaching system 1; line $o$ from leaching system I to hexamethylenetetramine drier J; line $p$ from leaching system I to still K; line $q$ from still K to precipitator G; line $r$—$s$ from hexamethylenetetramine drier J to storage-tank L; line $t$ from line $r$—$s$ to lines $p$ and $u$; line $u$ leading to line $g$; line $v$ from still K to line $u$; and line $w$ from still K to line $d$.

In the preferred practice of the process, the autoclave B receives a charge of auto-clave liquor from the stock-liquor tank D, this liquor being water substantially saturated, under atmospheric conditions of temperature and pressure, with hexamethylenetetramine and with ammonium chloride and strongly charged with ammonia. The desired charge of methylene chloride from tank A is also introduced into the autoclave, and ammonia from C is introduced, if necessary, preferably in sufficient quantity to bring the ammonia concentration up to an excess of 300% to 400% above the ammonia required theoretically to react with the charge of methylene chloride introduced into the autoclave. Heat is applied to the autoclave and continued for a period of from five to ten hours, or longer, depending upon the temperature employed and the ammonia concentration in the reacting liquor. In any event, the heating is continued long enough to complete the reaction. Preferably a temperature of about 100° C. is employed.

When the reaction is complete, the entire autoclave charge is transferred to the cooler and saturator E, where it is agitated and cooled and treated with ammonia from C, that is, ammonia is introduced into the container E until the ammonia content reaches the same value as it possessed before the reaction in the autoclave. The charge then is allowed to stand quietly until the ammonium chloride and hexamethylenetetramine produced in the reaction settle, and then most of the clear supernatant liquor is transferred through the pipe $g$ to the stock-liquor tank D. The remainder of the liquor, together with the precipitated ammonium chloride and hexamethylenetetramine, passes through line $h$ to the first leaching system designated F, where the hexamethylenetetramine is leached from the ammonium chloride, the filtrate, saturated with ammonium chloride and substantially saturated with hexamethylenetetramine being then passed to the precipitator G.

It may be mentioned here that it is important to introduce into the cooler and saturator E just sufficient ammonia to bring the solution to the same ammonia concentration as was possessed by the original autoclave liquor before the reaction between methylene chloride and ammonia occurred. Where this is done, all of the ammonium chloride and hexamethylenetetramine produced in the reaction are thrown out of solution in the cooler-saturator E. If insufficient ammonia is introduced at E, more ammonium chloride and less hexamethylenetetramine will be precipitated than was produced in the reaction. On the other hand, if too much ammonia is used at this point, more hexamethylenetetramine and less ammonium chloride than was produced in the reaction will be precipitated. To keep the system properly balanced, substantially the correct amount of ammonia should be introduced at E.

The apparatus shown in Fig. 2 is available for each leaching system F and I, it being observed, however, that the leaching apparatus I need not be of as large capacity as the leaching apparatus F.

Referring to Fig. 2, A', B', C', D' and E' designate filter-tanks having false bottoms supporting filter-cloths; F' designates a similar filter-tank; and G', H' I', J' and K' designate filtering-fluid tanks.

Each filter-tank is of sufficient capacity to receive an entire charge of the precipitated ammonium chloride and hexamethylenetetramine from the cooler and saturator E. The filter-tank E' may be assumed to be filled about two-thirds full of the mixture of said salts received from the cooler and saturator. Before the filtering operation which will be presently described, the mother liquor is withdrawn by suction from the filter-tank A', leaving the mixture of salts wetted, however, with the mother liquor. The filtering fluid in the tank G' at the beginning of a filtering operation is preferably pure water; that in the tank H' is the filtrate received from the tank G' after a preceding filtering operation performed in the filter-tank A'; that in the tank I' is the filtrate received from the tank H' after a filtering operation in the tank B'; and so on throughout the series. That is, the filtrate from any filter-tank of the series is employed as a filtering fluid for the next filter-tank of the series in the next cycle of operations. The filter-tank F' may be assumed to have passed through the cycle of filtering operations from right to left in the diagram shown in Fig. 2, to have been taken ultimately from the position of the tank A', where it contained only ammonium chloride wetted with a liquor containing a negligible amount of hexamethylenetetramine in solution, to have been emptied, the ammonium chloride being sent to the ammonia recovery plant H of Fig. 1, and finally to be standing by ready to receive a fresh charge of hexamethylenetetramine and ammonium chloride salts from the cooler and saturator E, after which the filter-tanks will be shifted one step to the left in Fig. 2, the tank F' entering the progression in the place of the tank E' and the tank A' being taken out of the series to have its contents sent to the ammonia recovery plant.

In Fig. 2, 1, 2, 3, 4 and 5 designate pipes connecting the lower ends of the filter-tanks with the upper ends of the corresponding filtering-fluid tanks, these pipes being equipped with unions $1^a$, $2^a$, $3^a$, $4^a$ and $5^a$; 6, 7, 8, 9 and 10 designate pipes connecting the bottoms of filtering-fluid tanks with the upper portions of the filter-tanks, these pipes being equipped with valves $6^a$, $7^a$, etc., and with unions $6^b$, $7^b$, etc., and also equipped with pumps $6^c$, $7^c$, etc.; 11, 12, 13 and 14 designate pipes connecting pipe 6 with pipe 2, pipe 7 with pipe 3, etc.; 15 designates a pipe leading from pipe 10 and by means of which the final filtrate may be conveyed to the precipitator G shown in Fig. 1, the pipes 11—15 being equipped with valves $11^a$—$15^a$; 16 designates a pipe communicating with the upper portion of the tank G' and equipped with a valve $16^a$, the pipe leading to an exhaust pipe 20 with which may be connected a vacuum pump (not shown); and 17, 18 and 19 designate pipes connecting the upper portions of the tanks H, I and J with the suction line 20, it being noted that suction line 20 is also connected with the upper portion of the tank K. The pipes 17—19 are equipped with valves $17^a$—$19^a$, and the pipe 20 is equipped with a valve $20^a$.

If we assume that at the beginning of a filtering operation involving all of the apparatus shown in Fig. 2, excepting the tank F', the tank E' is about two-thirds filled with a mixture of hexamethylenetetramine and ammonium chloride, wetted with mother liquor, which remains after applying suction to the filter-tank E', which may be done through the lines 5 and 20, and if we assume that the wetting fluid in the tank A' is about one-fourth of the leaching fluid (water) in the tank G', the filter-tanks A', B', C', and D' will contain ammonium chloride wetted with filtrates containing hexamethylenetetramine and ammonium chloride in solution, the amount of hexamethylenetetramine in the tank A' being quite small, that in the tank B' being larger, that in the tank C' still larger, and that in the tank D' still larger than that in the tank C'. This will be the situation after the system has reached a balanced condition, assuming that the salts being treated are in the proportion in which they are formed by reacting upon methylene chloride with ammonia, it being noted that the amount of ammonium chloride produced in such reaction is several times as large as the hexamethylenetetramine produced. It has been found by experiment that approximately 80% of the mother liquor can be removed from the salt mass by suction on a filter. Where this is true, the use of five filter-tanks in the leaching system is sufficient to accomplish the desired result. Were a larger percentage of the mother liquor to be left in the salt mass, it might become necessary to employ more tanks in the leaching system.

In a properly balanced condition of operation on the basis set forth above, the tank A', at the beginning of a leaching operation, contains substantially pure ammonium chloride with about 0.4% of the hexamethylenetetramine (in the salt-wetting solution) originally present in the salt mixture; tank B' contains ammonium chloride and approximately 1.5% of the original hexamethylenetetramine; tank C' contains ammonium chloride and approximately 6.2% of the original hexamethylenetetramine; and tank D' contains ammonium chloride and approximately 25% of the original hexamethylenetetramine. Tank E', as stated, contains a fresh charge of ammonium chloride and hexamethylenetetramine from the cooler-saturator E' of Fig. 1. The leaching fluid tank G' contains pure water; and the leaching fluid tanks H', I', J' and K' contain saturated solutions of ammonium chloride, these solutions being partly saturated (in successively increasing strengths) with hexamethylenetetramine, the solution in H' having a very low hexamethylenetetramine concentration and the solution in K' having a very much higher hexamethylenetetramine concentration, with I' and J' having intermediate concentration values. In the leaching operation, the fluid (water) in tank G' is circulated through the filter-tank A', where it becomes saturated with ammonium chloride and, at the same time, dilutes the wetting liquor of the ammonium chloride in tank A', until the amount of hexamethylenetetramine remaining in solution in the tank A' becomes practically insignificant, only a few hundredths of 1%. The leaching solution in tank H', resulting from a former leaching operation in the predecessor of the tank A', is saturated with ammonium chloride, and hence will not take up ammonium chloride from the tank B'. Similarly, the leaching fluids of the tanks I', J' and K' will not take up ammonium chloride from the filter-tanks C', D' and E'. On the other hand, the leaching fluids of the successive leaching tanks will become successively stronger in hexamethylenetetramine; and, finally, the leaching fluid of the tank K' will take up from the tank E' approximately 75% of the hexamethylenetetramine therein.

As has been stated, the filtrate in the tank K', at the end of the filtering operation, passes through the pipe 15 (corresponding with the pipe L of Fig. 1) to the precipitator G, where the hexamethylenetetramine is precipitated by means of ammonia. The mother liquor passes from the precipitator G to the still K, and after the desired amount of ammonia has been distilled from the liquor, the liquor passes to the stock-liquor tank D.

As has been indicated, the precipitated hexamethylenetetramine passes from the precipitator G to the second leaching system designated I. This may be similar in all respects to the leaching system shown in Fig. 2, except that the apparatus may be smaller. In the second leaching system, the tank E' contains a charge of hexamethylenetetramine received from the precipitator G, this hexamethylenetetramine being wetted with water saturated with ammonium chloride and hexamethylenetetramine. The purpose of the second leaching system is to take out the ammonium chloride from the mother liquor which wets the precipitated hexamethylenetetramine. This preferably is accomplished by passing successive charges of hexamethylenetetramine contained in the filter-tanks through the filter system from right to left in the diagram shown in Fig. 2. In this case, however, the filtering fluid in the tank G' preferably is water strongly charged with ammonia. The ammonia tends to prevent the hexamethylenetetramine from going into solution and also increases the solubility for ammonium chloride. By passing the filter-tanks containing the hexamethylenetetramine charges in succession through the filter system from right to left, and performing the filtering operations through the several filter-tanks in the manner stated above, the effect is to remove from the hexamethylenetetramine in each charge practically all of the ammonium chloride which is present in the wetting liquid. That is, this result is accomplished by the time the charge has progressed to the position of the tank A' and been subjected in that position to a washing operation with water surcharged with ammonia. At the end of the filtering operation, the filtrate from each of the filtering-fluid tanks is pumped into the next succeeding filtering tank, the final filtrate from the tank K', however, passing to the still K. The filter-tanks are then advanced one step to the left, a fresh charge taking the place of the tank E'. It will be noted, for example, that the filtrate from the tank G' can be pumped therefrom by the pump 6c through the lines 6, 11 and 2, to the tank H'. In an analogous manner, the filtrate from each of the filter-tanks can be emptied into the succeeding tank, after the latter has been emptied.

It may be added that by leaching hexamethylenetetramine in the manner described, practically all of the ammonium chloride may be removed therefrom, only a few thousandths of 1% remaining in the hexamethylenetetramine. The hexamethylenetetramine loss is insignificant. Also, it may be stated that after the removal of the tank A′ from the first leaching system, the tank then containing substantially pure ammonium chloride with only a small amount of hexamethylenetetramine remaining in the wetting fluid, water may be passed through the tank of ammonium chloride until all of the ammonium chloride is put into solution, and this solution may be pumped to the ammonia recovery plant H of Fig. 1.

It will be understood that when the leaching system F is first put into operation, the filter-tanks of the system may initially contain charges of salts from the cooler and saturator E, and that filtering operations may be carried on until the filtering system reaches a balance with graduated percentages of hexamethylenetramine in the wetting water of the ammonium chloride remaining in the filter-tanks; or any desired expedient may be resorted to at the outset to bring the charges in the filter-tanks into proper condition to enable the process to work smoothly thereafter.

The process described is adapted to the production of practically pure hexamethylenetetramine on a large scale, the plant being of any desired capacity within practical limits. The process operates smoothly and the system can be readily maintained in balanced condition.

Whilst hexamethylenetetramine is a base and not a "salt" in the strict sense, it is often spoken of as a salt and is referred to in this manner, for convenience, in the specification and claims. Also, the term "leaching" is conveniently employed in the specification and claims to denote the operation of passing a solvent or washing fluid through a mixture of solid compounds, or through a compound, for the purpose of effecting the desired separation.

The foregoing detailed description has been given for clearness of understanding only, but no unnecessary limitations should be understood therefrom, but the appended claims should be construed as broadly as permissible, in view of the prior art.

What is claimed is:

1. In effecting the separation of hexamethylenetetramine from ammonium chloride, the step which comprises: leaching with liquor saturated with respect to ammonium chloride a series of charges comprising ammonium chloride and hexamethylenetetramine.

2. In effecting the separation of hexamethylenetetramine from ammonium chloride, the step which comprises: leaching with liquor saturated with ammonium chloride a series of charges comprising ammonium chloride in solid form and hexamethylenetetramine in solution in successively increasing amounts.

3. In effecting the separation of hexamethylenetetramine from ammonium chloride, the steps comprising leaching with liquor, saturated with respect to ammonium chloride, ammonium chloride in solid form and hexamethylenetetramine in solution in successively increasing amounts, and passing the final filtrate as a leaching fluid through a charge comprising ammonium chloride and hexamethylenetetramine in solid form.

4. The process which comprises: forming hexamethylenetetramine and ammonium chloride from methylene chloride and ammonia; leaching successive charges of the mixture of salts thus produced in a series of containers containing relatively large amounts of ammonium chloride and successively increasing amounts of hexamethylenetetramine in solution, as a wetting fluid, the original leaching fluid being saturated with respect to ammonium chloride from the charge containing the least hexamethylenetetramine, the filtrate from each charge being employed as a filtering fluid for the next succeeding charge; and leaching a fresh charge of hexamethylenetetramine and ammonium chloride with the filtrate from the next preceding charge in the series.

5. The process which comprises: forming hexamethylenetetramine and ammonium chloride by reaction between methylene chloride and aqueous ammonia in a liquor substantially saturated with hexamethylenetetramine and ammonium chloride, in the presence of an excess of ammonia; introducing ammonia into the reaction liquor and restoring the liquor substantially to the concentration existing previous to the reaction and precipitating the salts formed in the reaction; separating the clear liquor from the precipitated salts; subjecting successive charges of the salts to serial leaching, the filtrate from each charge being saturated with ammonium chloride and being employed to leach the next succeeding charge, the last charge in the series being a mixture of hexamethylenetetramine and ammonium chloride substantially in the proportions formed, but wetted with a solution of both salts; and surcharging the final filtrate with ammonia and thus precipitating a major portion of the hexamethylenetetramine.

6. The process which comprises: forming hexamethylenetetramine and ammonium chloride by reaction between methylene chloride and aqueous ammonia in a liquor substantially saturated with hexamethylenetetramine and ammonium chloride, in the presence of an excess of ammonia; introducing ammonia into the reaction liquor and restoring the liquor substantially to the concentration existing previous to the reaction and precipitating the salts formed in the reaction; separating the clear liquor from the precipitated salts; subjecting successive charges of the salts to serial leaching, the filtrate from each charge being saturated with ammonium chloride and being employed to leach the next succeeding charge, the last charge in the series being a mixture of hexamethylenetetramine and ammonium chloride substantially in the proportions formed, but wetted with a solution of both salts; surcharging the final filtrate with ammonia and thus precipitating a major portion of the hexamethylenetetramine; and leaching the precipitated hexamethylenetetramine with a liquor comprising ammonia.

7. The process which comprises: forming hexamethylenetetramine and ammonium chloride by reaction between methylene chloride and aqueous ammonia in a liquor substantially saturated with hexamethylenetetramine and ammonium chloride, in the presence of an excess of ammonia; introducing ammonia into the reaction liquor and restoring the liquor substantially to the concentration existing previous to the reaction and precipitating the salts formed in the reaction; separating the clear liquor from the precipitated salts; subjecting successive charges of the salts to serial leaching, the filtrate from each charge being saturated with ammonium chloride and being employed to leach the next succeeding charge, the last charge in the series being a mixture of hexamethylenetetramine and ammonium chloride substantially in the proportions formed, but wetted with a solution of both salts; surcharging the final filtrate with ammonia and thus precipitating a major portion of the hexamethylenetetramine; and leaching the precipitated hexamethylenetetramine with water strongly charged with ammonia.

8. The process which comprises: forming hexamethylenetetramine and ammonium chloride by reaction between methylene chloride and aqueous ammonia in a liquor substantially saturated with hexamethylenetetramine and ammonium chloride, in the presence of an excess of ammonia; introducing ammonia into the reaction liquor and restoring the liquor substantially to the concentration existing previous to the reaction and precipitating the salts formed in the reaction; separating the clear liquor from the precipitated salts; subjecting successive charges of the salts to serial leaching, the filtrate from each charge being saturated with ammonium chloride and being employed to leach the next succeeding charge, the last charge in the series being a mixture of hexamethylenetetramine and ammonium chloride substantially in the proportions formed, but wetted with a solution of both salts; surcharging the final filtrate with ammonia and thus precipitating a major portion of the hexamethylenetetramine; leaching the precipitated hexamethylenetetramine with water strongly charged with ammonia; and drying the hexamethylenetetramine and freeing it from ammonia.

9. The process which comprises: forming hexamethylenetetramine and ammonium chloride by reaction between methylene chloride and aqueous ammonia in a liquor substantially saturated with hexamethylenetetramine and ammonium chloride, in the presence of an excess of ammonia; introducing ammonia into the reaction liquor and restoring the liquor substantially to the concentration existing previous to the reaction and precipitating the salts formed in the reaction; separating the clear liquor from the precipitated salts; subjecting successive charges of the salts to serial leaching, the filtrate from each charge being saturated with ammonium chloride and being employed to leach the next succeeding charge, the last charge in the series being a mixture of hexamethylenetetramine and ammonium chloride substantially in the proportions formed, but wetted with a solution of both salts; surcharging the final filtrate with ammonia and thus precipitating a major portion of the hexamethylenetetramine; and leaching the precipitated hexamethylenetetramine with water strongly charged with ammonia, the leaching fluid passing serially through a series of charges of hexamethylenetetramine containing successively more and more ammonium chloride in the wetting solution, the final charge in the series being hexamethylenetetramine as precipitated, wet with the mother liquor in which precipitation occurred.

10. The process which comprises: forming hexamethylenetetramine and ammonium chloride by reaction between methylene chloride and aqueous ammonia in a liquor substantially saturated with hexamethylenetetramine and ammonium chloride, in the presence of an excess of ammonia; introducing ammonia into the reaction liquor and restoring the liquor substantially to the concentration existing previous to the reaction and precipitating the salts formed in the reaction; separating the clear liquor from the precipitated salts; subjecting successive charges of the salts to serial leaching, the filtrate from each charge being saturated with ammonium chloride and being employed to leach the next succeeding charge, the last charge in the series being a mixture of hexamethylenetetramine and ammonium chloride substantially in the proportions formed, but wetted with a solution of both salts; surcharging the final filtrate with ammonia and thus precipitating a major portion of the hexamethylenetetramine; leaching the precipitated hexamethylenetetramine with water strongly charged with ammonia, the leaching fluid passing serially through a series of charges of hexamethylenetetramine containing successively more and more ammonium chloride in the wetting solution, the final charge in the series being hexamethylenetetramine as precipitated, wet with the mother liquor in which precipitation occurred; and drying the charge of hexamethylenetetramine first in the series of leached charges.

MYRTICE G. CARTER,
*Executrix of the Estate of Carnie B. Carter, Deceased.*